United States Patent
Kawahara et al.

(10) Patent No.: US 8,042,110 B1
(45) Date of Patent: Oct. 18, 2011

(54) DYNAMIC GROUPING OF APPLICATION COMPONENTS

(75) Inventors: Hideya Kawahara, Mountain View, CA (US); Paul V. Byrne, Los Altos, CA (US); Frank E. Ludolph, Menlo Park, CA (US)

(73) Assignee: Oracle America, Inc., Redwood City, CA (US)

( * ) Notice: Subject to any disclaimer, the term of this patent is extended or adjusted under 35 U.S.C. 154(b) by 1301 days.

(21) Appl. No.: 11/166,756

(22) Filed: Jun. 24, 2005

(51) Int. Cl.
*G06F 9/46* (2006.01)
*G06F 3/048* (2006.01)

(52) U.S. Cl. .................. 718/100; 715/764; 715/765

(58) Field of Classification Search .................. 715/781, 715/234, 205; 718/100
See application file for complete search history.

(56) References Cited

U.S. PATENT DOCUMENTS

| | | | | |
|---|---|---|---|---|
| 5,835,089 A * | 11/1998 | Skarbo et al. | | 715/751 |
| 5,880,733 A * | 3/1999 | Horvitz et al. | | 715/850 |
| 6,002,403 A * | 12/1999 | Sugiyama et al. | | 715/717 |
| 6,108,714 A * | 8/2000 | Kumagai et al. | | 719/310 |
| 6,292,187 B1 | 9/2001 | Gibbs et al. | | |
| 7,243,352 B2 * | 7/2007 | Mandava et al. | | 718/104 |
| 7,464,367 B2 * | 12/2008 | Wain et al. | | 717/105 |
| 7,581,192 B2 * | 8/2009 | Stabb et al. | | 715/781 |
| 2003/0050800 A1 * | 3/2003 | Brandt et al. | | 705/2 |
| 2003/0167402 A1 * | 9/2003 | Stolfo et al. | | 713/200 |
| 2003/0179240 A1 * | 9/2003 | Gest | | 345/779 |
| 2004/0083479 A1 * | 4/2004 | Bondarenko et al. | | 719/310 |
| 2004/0215650 A1 * | 10/2004 | Shaji et al. | | 707/102 |
| 2005/0146507 A1 | 7/2005 | Viredaz | | |
| 2006/0069604 A1 * | 3/2006 | Leukart et al. | | 705/9 |
| 2006/0236372 A1 * | 10/2006 | Dunn | | 726/2 |

OTHER PUBLICATIONS

Roth; "A User Interface Environment for Exploring Information"; Proceedings of the IEEE Symposium on Information Visualization; Oct. 1996; 8 pages.

* cited by examiner

*Primary Examiner* — Meng An
*Assistant Examiner* — Tammy Lee
(74) *Attorney, Agent, or Firm* — Robert C. Kowert; Meyertons, Hood, Kivlin, Kowert & Goetzel, P.C.

(57) ABSTRACT

Application boundary decomposition and dynamic grouping of application components may provide a user with a task-oriented, user-configurable, dynamic user interface. An operating system may include various individual application components and a user may be able to organize the application components to create custom task groupings for performing specific tasks. The components of a single task grouping may be displayed within a single task frame or border. Alternatively, the components may be displayed upon on the user's desktop without such a border along with other desktop icons. Application components may be dynamically rearranged, either by the user or automatically in response to user context changes or according to a priority relationship among the application components. Additionally, multiple application components may access a single shared copy of data and task groupings may be shared among different users using different computer systems.

20 Claims, 9 Drawing Sheets

DYNAMIC GROUPING OF APPLICATION COMPONENTS

BACKGROUND OF THE INVENTION

1. Field of the Invention

This invention relates computer applications in general, and more particularly to user customizable task-centric groupings of application components.

2. Description of the Related Art

Traditionally, a computer system includes multiple applications, each of which include an application-specific set of components that are presented and arranged according to the desires of the application developer. A computer application generally consists of various user interface components and associated processing code grouped together according to the desires of the application designer/programmer. A user of a traditional system may have to use individual parts of various, different applications in order to complete a single task. For example, when scheduling a meeting, a user may have to first use email, instant messenger, or other communications applications to contact all attendees to determine a time to hold the meeting. After the user has determined an appropriate time to hold the meeting, he or she may use a calendar program to actually schedule the meeting, such as in an organization wide calendar. Additionally, the user may compose a meeting agenda and other documents in a word processing and/spreadsheet program. As the meeting time approaches, the user may return to an email (or other communications) program to send out reminders about the meeting. Thus, individual components of different applications may be required to complete a single user task, such as scheduling a meeting. Furthermore, traditionally there is no way for a user to rearrange or group the individual features of the various applications into a single task-oriented user interface.

Additionally, multiple applications may include similar (or duplicate) user interfaces, processing code, and stored data. For example, an email program and an instant messenger application both may maintain individual address books with no way of coordinating between the two lists and may also both include similar user interface and processing code to create and maintain the individual entries of the address books. A user may have to update a contact's information in both the email program and the instant messenger application. Thus, traditional computer systems provide an application-centric interface to a user and users must determine for themselves those applications that provide the appropriate features and components needed for any individual task.

SUMMARY

Application boundary decomposition and dynamic grouping of application components may provide a user with a task-oriented, user-configurable, dynamic user interface. For example, a computer system may include various individual application component processes or services, such as email services, instant messaging, calendar, as well as file and document management. A user may be able to arrange user interface components associated with, or linked to, individual application components, to create custom groupings for performing a specific task. For instance, a user may select a contact list, a group of previously received email messages, and several documents or files, all of which may be associated with a single user task or project. The user may also group the various components into a single, persistent, task grouping associated with the task, such as by a task or project name. In some embodiments, the components of a single task grouping may be displayed within a single task frame (or border). In other embodiments, however, the components may not be displayed within a border, but instead may be displayed upon on the user's desktop along with other, traditional, desktop icons. In one embodiment only a single desktop icon representing the task grouping may be displayed, while the individual components of the task grouping may only be displayed after the user selects the main task icon.

Additionally, application components may be dynamically rearranged, either by the user or in response to user context changes. For example, a user may move components between task groupings, change the locations of individual component and task groupings, as well as add or delete components or task groupings. Thus, a user may create custom sets of application components that allow the user to perform all activities related to a task or project from a single task grouping without having change from application to application. Rather than relying upon several applications, each of which may provide only a portion of the full functionality required for a task, a user may create a custom user interface (i.e. a custom grouping of individual user interface components) specifically related to the task at hand. Hence, all application components required by the user may be available together as a single, task grouping.

Each application component may represent a portion of shared information on the computer system. Additionally, multiple application components may access a single shared copy of data. Consequently, a user may be able to maintain only a single shared version of information, rather than maintain multiple, similar version via different applications. For example, in one embodiment, a single shared address book or contact list may be maintained and used by all components that need contact information, such as email, instant messenger, calendar, and telephony components.

Task groupings may include individual files and folders, as well as functional application components. Additionally, a task grouping may include user interface components representing individual entities, such as a person, a group of people, a printer or fax machine or other computer device. Furthermore, individual application components are active within a task grouping such that a user may interact with them to perform various software processes. Thus, even though the application components may appear on the user's desktop like traditional program icons (or shortcuts), a user may interact with them as with any other running application, in some embodiments. For example, a user might right click on a component representing a contact list to select a contact and bring up an email message interface component to communicate with the contact.

Thus, application boundary decomposition and dynamic grouping of application components may allow a user to group and arrange application components according to the user's intended use of those components.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Application boundary decomposition and dynamic grouping of application components may include a task grouping mechanism configured to provide user access to individual application components, such as user interfaces and corresponding processing code traditionally included only in separate applications. For example, FIG. 1 is a block diagram illustrating a task grouping mechanism 120 allowing a user to interact with and access individual application component services and user interfaces, according to one embodiment.

Figure 1:
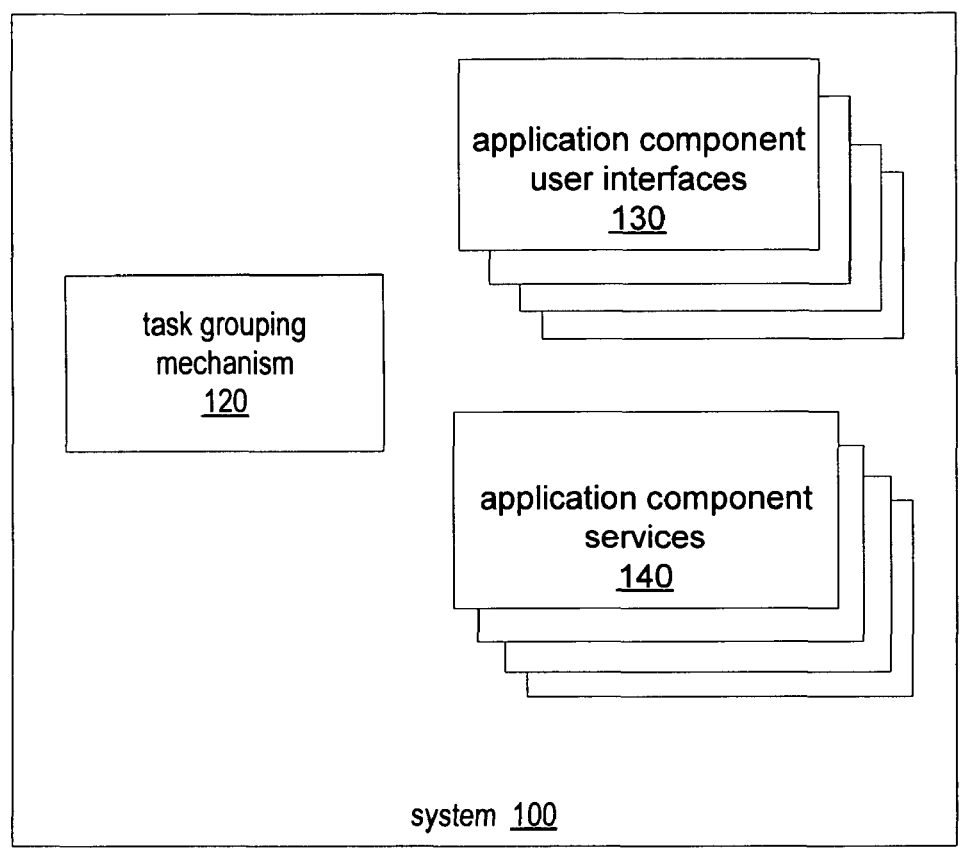
FIG. 1 is a block diagram illustrating a computer system including individual application components, according to one embodiment.

System 100 in FIG. 1 may represent any of various types of computer systems include various computer architectures and may include any of various operating systems, such as Sun OS, MS windows, Unix, Linux, etc. Task grouping mechanism 120 may provide individual, independent, application components, such as application component services 140 and application component user interfaces 130, to a user via the operating system, rather then via individual applications. For example, task grouping mechanism 120 may provide various communication services, such as email and instant messaging via individual application components of the operating system, in one embodiment. In another embodiment, task grouping mechanism 120 may provide user access to calendar and appointment interfaces as well as document editing, web page creation and viewing, etc. In general, an individual application component for virtually any user activity may be provided by task grouping mechanism 120 and made available to users via application boundary decomposition and dynamic grouping of application components. In some embodiments, task grouping mechanism 120 may be part of an operating system, while in other embodiments task grouping mechanism 120 may be separate from the operating system, but may rely upon various software libraries and/or services provided by the operating system.

Additionally, application boundary decomposition and dynamic grouping of application components may include a single, shared storage for all the various application components. As noted above, multiple traditional applications may store and maintain very similar sets of data/information. For example, both an email application and an instant messaging application may store their own, respective contact lists and those contact lists may overlap by including many of the same people and information. Thus, when using traditional applications, a user may have to update and maintain both lists via the respective applications. When utilizing application boundary decomposition and dynamic application component grouping, multiple independent application components may access a single, shared version of data, such as an address book or contact list. While some application components may be related to other application components, in general each application component is an independent, software entity not specifically a part of, or linked to, another application. Rather than having to maintain two different address books, one according to an email application and another according to an instant messenger application, a user may, in some embodiments, maintain a single address book that may be accessed and utilized by any multiple application components provided by task grouping mechanism 120.

Each application component user interface 130 may represent a part of the shared data or information on the system 100, according to one embodiment. For example, even though both an email component and an instant messaging component may share a single address book, another application component may be used to represent the address book as a whole. For instance, a component representing a contact list or address book may allow a user to view and/or edit all the entries in the shared address book, while a component representing a single contact may only allow the user to access/edit the single entry for that contact. Similarly, a user interface component representing a folder of received email messages may allow a user to access/update/delete all the email messages in the folder, while a component representing a single email message may only allow viewing/updating/deleting of the single email message.

Additionally, each application component may include a user interface allowing the user to interact with and utilize the component's functionality, according to some embodiments. For example, an application component representing an email message, or a folder of email messages, may also include user interface components suitable for allowing a user to generate and send email messages. In one embodiment an email component may provide a similar user interface as a traditional email application, but which may, unlike the traditional application, be grouped with other application components according to a specific task. When using custom defined task groupings, a user may add the same application component to multiple task groupings, according to one embodiment. Being able to add a single component to multiple task groupings may allow a user to more quickly complete a given task than when having to switch contexts to different applications. For example, rather than having to locate and activate a calendar application in order to update task specific meeting and appointments, a user may be able to add components representing the specific meetings and appointments to the relevant task groupings, in some embodiments. Thus, application boundary decomposition and dynamic application component grouping may, in some embodiments, allow the user to create persistent task groupings that function like custom applications.

According to one embodiment, the user may arrange multiple application components (both services and/or user interfaces) in a loosely grouped manner based on a single user task or project. Please note that the terms "component" and "application component" as used herein may refer to a service, a user interface, or both. A user may create task-specific or task-centric groupings of application components and the resultant task groupings more closely match the user's work activities than traditional applications. Task groupings may be displayed on the user's desktop either within a specific task window or folder, or as a loosely fixed grouping of individual components without such a fixed boundary, according to various embodiments.

The individual application components and component user interfaces may be implemented according to any of various computer-programming methodologies. For example, application components may be implemented as individual modules written in C/C++, in one embodiment, or as collections of JAVA objects in another embodiment. Additionally, while application boundary decomposition and dynamic application component grouping is described herein mainly in terms of a task grouping mechanism executing separately from an operating system, in some embodiments, such a task grouping mechanism may be part of an operating system. In some embodiments, application components may be implemented as individual software objects, libraries or modules, but in other embodiment, application components may be implemented as part of an application using services and/or software libraries provided by an operating system.

Figure 2:
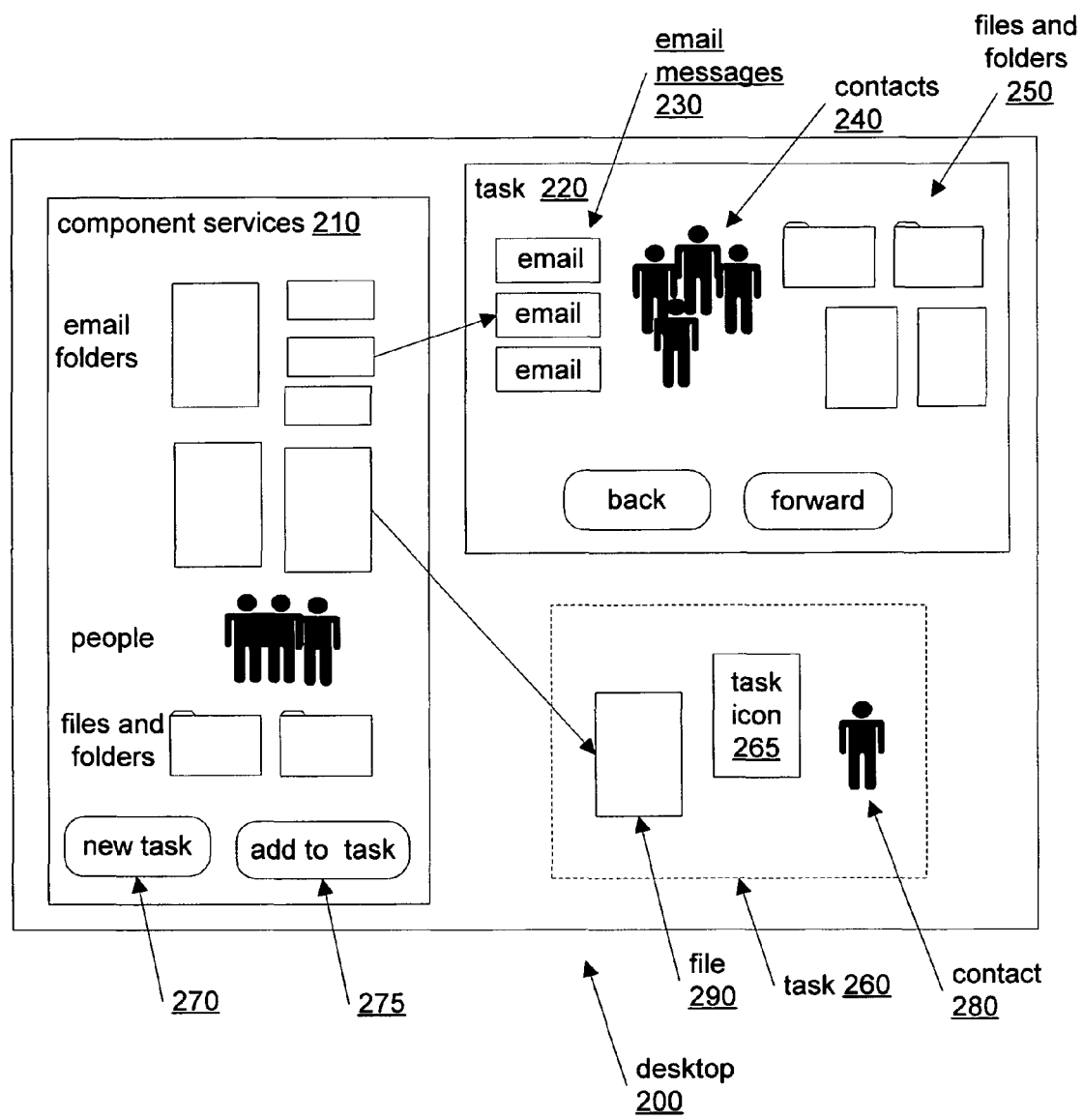
FIG. 2 is a block diagram illustrating one embodiment of a user interface for creating task groupings of application components.

According to application boundary decomposition and dynamic grouping of application components, a user may create a task grouping by dragging and dropping application component services from a top-level task area to an individual task grouping area. For Example, FIG. 2 is a block diagram illustrating a user interface for selecting application components when creating individual task groupings. Task grouping mechanism 120 may display on desktop 200 a top-level task area, such as component services 210, that may display the various application components available to a user. A user may select an application component and drag and drop the component onto a window frame for an existing task. The top-level task area, such as component services 210 in FIG. 2, may also provide a mechanism to create a new, empty task grouping. For example, new task button 270 may create new empty task grouping mechanism, according to one embodiment. After creating an empty task grouping the user may select, drag, and drop individual application components or files onto the task grouping. Additionally, a user may drag and drop components and/or files from one task grouping to another and may also rearrange or delete components for an individual task grouping.

As noted above, individual application components may represent files, people, email messages, web pages, and even running applications. Additionally, in some embodiments, task grouping mechanism 120 may dynamically change the contents of a top-level task area based upon the user's current activity or context. For instance, task grouping mechanism 120 may include recent emails, messages, or other data related to the user's current activity or user input. For example, task grouping mechanism 120 may include in a top-level talk area a recent email from, or an upcoming appointment with, a contact with which the user is currently communicating. In one embodiment, task grouping mechanism 120 may dynamically update the contents of a top-level task area, such as component services 120, as the user's activity changes. While the above discussions describe a user selecting the actual application components from a top-level task area, in some embodiments, that top-level task area may include representations, such as icons, images, names, etc, of the application components rather than instances of the actual components.

In addition to specific application components, a top-level task area, such as component services 120, may also allow a user to select files or documents to include in task groupings. For example, a user may be able to select documents relevant to a particular task and include those documents in a related task grouping. Thus, component services 120 may, in one embodiment, include a user interface for exploring a hard drive or other storage system and for selecting files and documents in task groupings. Additionally, in some embodiments, a user may be able to include only a portion of a document in a task grouping. For example, a user may be able to select a portion of a document in a text editing application (or application component from a task grouping) and drag that portion of the document into a task grouping, thereby creating a component representing only that portion of the document. In one embodiment the newly created component may only allow editing of that portion of the document. According to some embodiments, a new file including only the selected portion of the original document may be created and associated with the new component. In other embodiments, however, the new component may represent only the selected portion of the original document and may allow the user to view or edit that portion of the original document.

In one embodiment, a top-level task area, such as component services 120, may display available components in any of a number of different manners. For example, in one embodiment, icons may be used to represent individual components (both user interfaces and services). In another embodiment, a textual listing or hierarchy tree may be utilized. In general any suitable method of displaying multiple, individual items may be used to displaying available application components for use when creating task groupings.

In some embodiments, the individual components of a single task grouping may be linked together such that if a user brings one of the components to the foreground the other components of the task grouping may automatically be brought to the foreground. Additionally, when a user moves a single component of the task grouping, the other components of the task grouping may move as well, maintaining the spatial arrangement of the grouping as a whole. In yet other embodiments, the spatial relationship between individual components of a task grouping may change dynamically according to various contextual situations. For example, in one embodiment, the individual user interface components may dynamically rearrange according to the priority of the sub-task associated with a component or according to which component is most likely to be used next when performing the task associated with the task grouping. Context based automatic rearranging to components within a task grouping will be discussed in more detail below with reference to FIGS. 5A and 5B.

According to various embodiments, task grouping mechanism 120 may present a number of different types of application components for creating custom task groupings. For example, a user may select files and folders 250, contact information (for individuals and well as entire contact lists), such as contacts 240, and email messages, such as email messages 230. Additionally, task grouping mechanism 120 may allow a user to select an application component to execute as part of a task grouping. For example, a user may be able to select a component that monitors the presence and availability of a set of contacts. For instance, a user may add an instant messenger component to a task grouping and the component may be configured to execute in the background and monitor the availability of contacts via instant messenger. In some embodiments, the actual user interface for such a component may be configured to change dynamically based upon the availability of the contacts. For instance, the component may display a different icon or other display element when a contact's availability has changed.

In some embodiments, the user may be able to add individual contacts to a task grouping. For instance, in one embodiment, a user may add contact 280 to task 260 and contact 280 may be configured to monitor the availability of contact 280 via an underlying component service. For example, if the contact information for contact 280 includes an instant messenger screen name, the component may be configured to monitor the availability of contact 280 via instant messaging. Additionally, in some embodiments a single contact component may monitor the availability of a contact via multiple communication mechanisms. For instance, the component service for contact 280 may, in addition to monitoring contact 280's availability via instant messaging, monitor contact 280's availability via telephone or web conferencing, according to one embodiment. In general, application components may execute in the background (or foreground) to monitor the status of various task related conditions, such as the presence and availability of contacts or whether a file has been edited. As another example, a component representing a folder or group of emails may be configured to monitor newly received emails and notify the user, such as by dynamically changing its display, to indicate the arrival of a new email. Alternatively, a component representing a contact may dynamically update its display to indicate the receipt of an email message from that contact.

A user may, in some embodiments, group components together as a task grouping within a task window, such as illustrated by task 220 in FIG. 2. Task 220 may include a folder or window border similar to traditional folder borders and task grouping 220 may be moved, minimized, and/or maximized like other application windows. However, task grouping 220 may include components that are not traditionally included in a file folder, such as components representing people, email messages, web pages, or even running applications, processes or services, according to various embodiments. Thus, rather than being a grouping of merely static icons and shortcuts, task 220 includes actual user interfaces and executing services.

Additionally, in some embodiments, a user may group a set of application components together as a task grouping without using a specific border or boundary, such as illustrated by task 260 in FIG. 2. Please note that the dashed outline around the components of task 260 is for explanatory purposes only and may not be displayed as part of a task grouping. According to the embodiment illustrated by FIG. 2, task 260 includes contact 280 and file 290, as well as task icon 265. When creating and using a task grouping without a task border or boundary, such as window border, task grouping mechanism 120 may automatically include a main task icon, or other component, for the task grouping that may be configured to provide pop-up menus or another user interface to interact with and modify attributes of the task grouping. When adding a new component to task 260, a user may drag and drop the new component over the main task icon 265, according to one embodiment, and task icon 265 may associate the dropped component with the other components already a member of task 260. Alternatively, component services 210 may also provide a button, menu or other user interface control, such as add to task button 275 allowing a user to add a new component to a task grouping. For instance, a user may select a component listed in component services 210 and then select add to task button 275. In response, add to task button 275 may bring up a user interface listing all currently available tasks, allowing the user to pick one. In yet another embodiment, a user may select both a desired application component and a task icon, such as contact 280 and task icon 265, and select add to task button 275 to associate the select component with the task grouping.

Task icon 265 may also serve as the main anchor point for a spatial arrangement of the components in task 260, in one embodiment. Thus, after creating task 260 and adding application components to it, the physical location of each of the components of task 260 may be defined relative to the physical position of the main task icon 265. Thus, in one embodiment, if a user moves task icon 265 the other components in task 260 may be moved accordingly so that each component maintains its position relative to the location of task icon 265. Additionally, in some embodiments, when task 260 is not currently active, such as when a user is using another task or application, task icon 265 may be the only component of task 260 visible. For example, the other components of task 265 may be hidden or minimized. When the user selects task icon 265, the other components may be displayed as well, thus allowing the user easy access to the components, but without having them constantly displayed. In some embodiments, task groupings may be configured to allow the user to specify which components of the task should remain visible and which should be hidden when the task is made inactive (such as be selecting a different task grouping or application). In one embodiment, selecting or clicking on task icon 265 may restore the components in task 260 to their original or default physical locations even if the user has moved them during use. In other embodiments, however, components moved by a user maintain their new positions relative to task icon 265. Task icon 265 may provide a user interface, such as a pop-up menu, allowing the user to select, activate, hide or even delete one of the components in the task, according to one embodiment.

In some embodiments, a task icon associated with a task grouping may be displayed along with icons for other running applications, such as in a task bar along one edge of the user's desktop area. A user may interact with such a task icon to select or active the corresponding task grouping, according to one embodiment.

Individual component user interfaces may be displayed as icons, images, or more active interface elements, according to various embodiments. Unlike traditional icons and shortcuts, a component's user interface and controls may execute various component services and may include component services executing in the background with which a user may interact. For example, short use application components, such as an individual calendar control or address book entry may be added to a task grouping and may be in a running state whenever the task grouping is active. Thus, contact 280 may be in a running state and may be configured to provide pop-up menus and/or other user interface controls allowing a user to access information and services associated with contact 280. For example, in one embodiment, a user may be able to right click on contact 280 and select a popup menu item to bring up the last email message from the person associated with contact 280. In another embodiment, right clicking on contact 280 may allow the user to select a menu-item to display a window including the full contact and availability information for contact 280. A user may also be able to initiate the sending of an email message to contact 280 via a popup menu provided by contact 280, according to certain embodiments.

A top-level task area, such as component services 210, may be automatically hidden when not in use. For example, in one embodiment, component services 210 may be automatically hidden, minimized or moved off screen when not in use. Alternatively, component services 210 may be implemented as a pop-up task bar anchored on one edge (either horizontal or vertical) of the user's desktop and may automatically slide into view when the user moved the mouse close to that edge of the view. In another embodiment, the hiding and displaying of the top-level task area can be implemented by "panning" the desktop view rather than the top-level task area. Thus, a user's desktop area may be expanded to always include the top-level task area, but whether or not the top-level task area is currently in view may depend upon whether or not the current view is panned accordingly, in one embodiment.

A task grouping mechanism implementing application boundary decomposition and dynamic grouping of application components may also keep track of changes made to task groupings, according to one embodiment. For example, in one embodiment, task grouping mechanism 120 may record any changes made to a task grouping and may allow a user to view the history of each task grouping. Task grouping mechanism 120 may, in one embodiment, record which components were used, edited, added, or deleted in each task grouping. Additionally, task grouping mechanism 120 may be configured to allow a user to review the history of such changes and to revert a task grouping back to a specific previous configuration. In another embodiment, task grouping mechanism 120 may be configured to record the order in which a user accesses and interacts with both individual components and task groupings. To enable the user to review this usage history, task grouping mechanism 120 may provide a user interface, such as "forward" and "back" buttons, as in task 220 of FIG. 2. For example, in response to the user selecting a "back" button task grouping mechanism 120 may redisplay a previous state of all task groupings and components. If the user subsequently selects a "forward" button task grouping mechanism 120 may then redisplay a later state of task groupings and components. In some embodiments, task grouping mechanism 120 may record a single history, recording the changes occurring to task groupings through user activity. For instance, task grouping mechanism 120 may record when a user switches from one task grouping to another and may allow the user to return to a previous task grouping (and the previous state of that task grouping) through a recorded history of task grouping states. For example, a "back" button may activate or bring to the foreground a task grouping that was previously minimized or hidden by the user. Thus, by recording state changes to individual task groupings as well as for all task groupings as a whole, task grouping mechanism 120 may allow a user to return to virtually any previous state of the task groupings.

When responding to a user's selection of a "back" or "forward" button, task grouping mechanism 120 may treat each state of a task grouping as an individual, distinct task grouping. Thus, in some embodiments, any function or activity that a user may perform on a task grouping (e.g. moving, rearranging, adding, deleting, sharing, etc) may, in some embodiment, be performed on an individual state of a task grouping. For example, in one embodiment, a user may use a "back" button to return to an earlier state of a task grouping and may then save a definition of that task grouping for use in recreating that task grouping on a different computer system (as will be described in more detail below). In general, task grouping mechanism 120 may be configured to allow a user to specify which components and/or task groupings are included in the history, how long of history to maintain, etc., according to various embodiments. In one embodiment, "forward" and "back" buttons may be included with each task grouping, while in other embodiments, a single set of "forward" and "back" buttons may be provided, such as in the top-level task area, or in another area on the user's desktop (such as in a system taskbar, for example).

Figure 3:
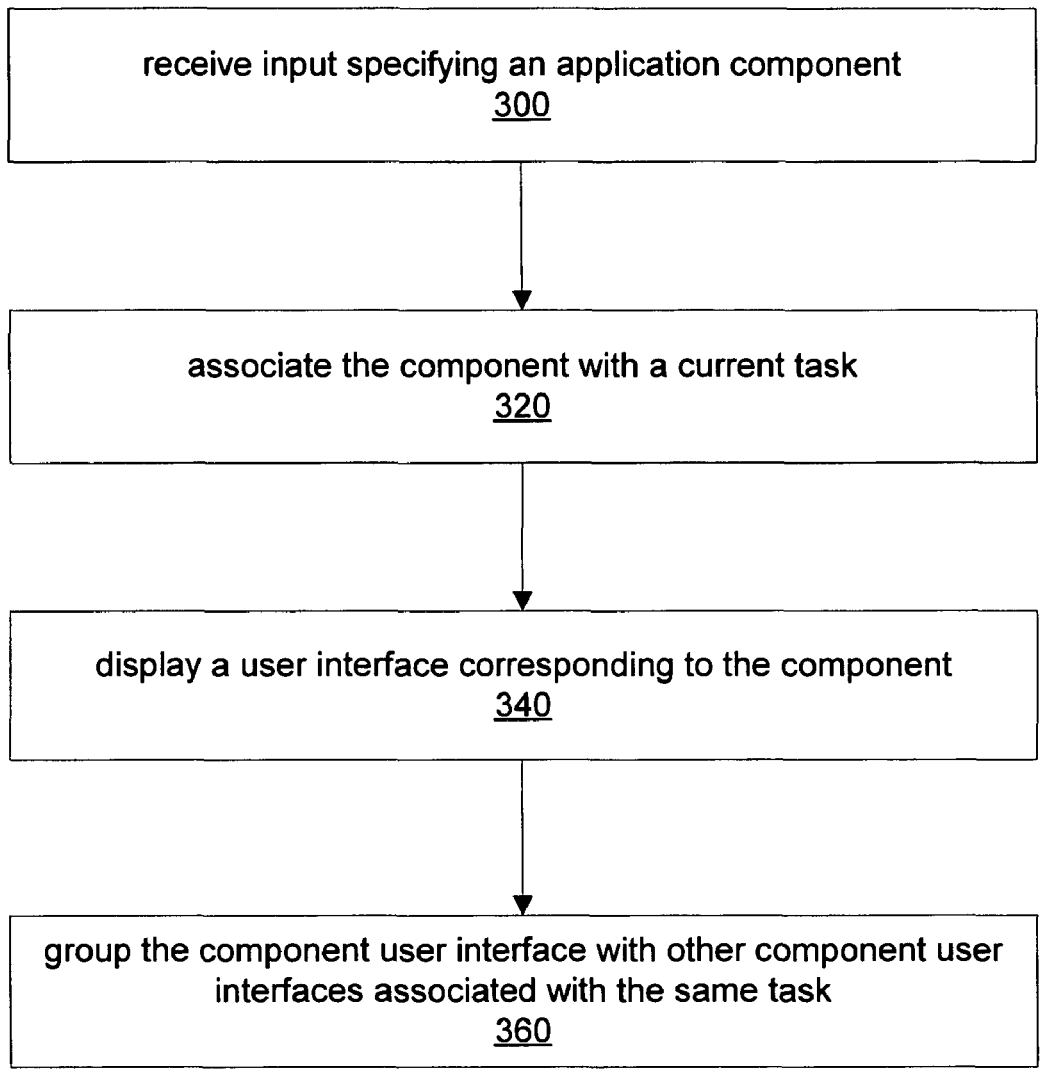
FIG. 3 is a flowchart illustrating one embodiment of a method for creating task groupings of application components.

FIG. 3 is a flowchart illustrating one embodiment of a method for creating user customizable task groupings. As noted above, a user may select various component services and group them together, such as for a single task. A user may select one or more component services through a selection user interface mechanism, such as a top level task area, provided by the task grouping mechanism. For example, task grouping mechanism 120 may provide a top-level task area that includes various component services, user interfaces and/ or other information, such as context sensitive information regarding the user's current activities, as noted above. Thus, the task grouping mechanism may receive input specifying an application component, as indicated by block 300. For example, the user may have selected an application component from a top-level task area, such as from component services 210, described above. In one embodiment, the user may drag and drop component user interface elements from a top-level task area to an already existing task grouping, such as task 220, also described above. As noted above, a task grouping may be configured to allow a user to rearrange the components within the task grouping, according to some embodiment.

The task grouping mechanism may associate the selected application component with a current task, as illustrated by block 320. For instance, a user may drag a component, such as a contact list, to a task grouping, such as task 210, and the task grouping mechanism may associate the selected contact list with the task grouping, allowing the user to access that contact list whenever he or she is working with the task grouping. As noted above, an application component may be associated with a task grouping in various manners, according to various embodiments. For example, in one embodiment, a user may drag a desired application component onto a window associated with a task grouping, such as task 220 in FIG. 2. Alternatively, in another embodiment, a user may drag the desired application component onto an icon for the task grouping, such as task icon 265, also in FIG. 2. Please note, as described above, the same component may be associated with and be displayed with multiple task groupings. The task grouping mechanism may also display a user interface for the selected component with the task grouping, as illustrated by block 340. In one embodiment, the user may select a desired component by selecting a user interface element associated with a desired component service. In another embodiment, the user may be able to select the underlying component service and the task grouping mechanism may automatically select and display a user interface element corresponding to the component service.

The task grouping mechanism may also group the displayed components with other components associated with the same task, as illustrated by block 360. For instance, a user may select several different application components to group together as a single task grouping, such as task 220. For example, task 220, discussed above, may include a set of email messages, a number of contacts, and a set of documents, all of which relate to a specific task or project a user is working on. The task grouping mechanism may maintain the grouping of these components so that the user may have easy access to any one of them from the task grouping.

Figure 4:
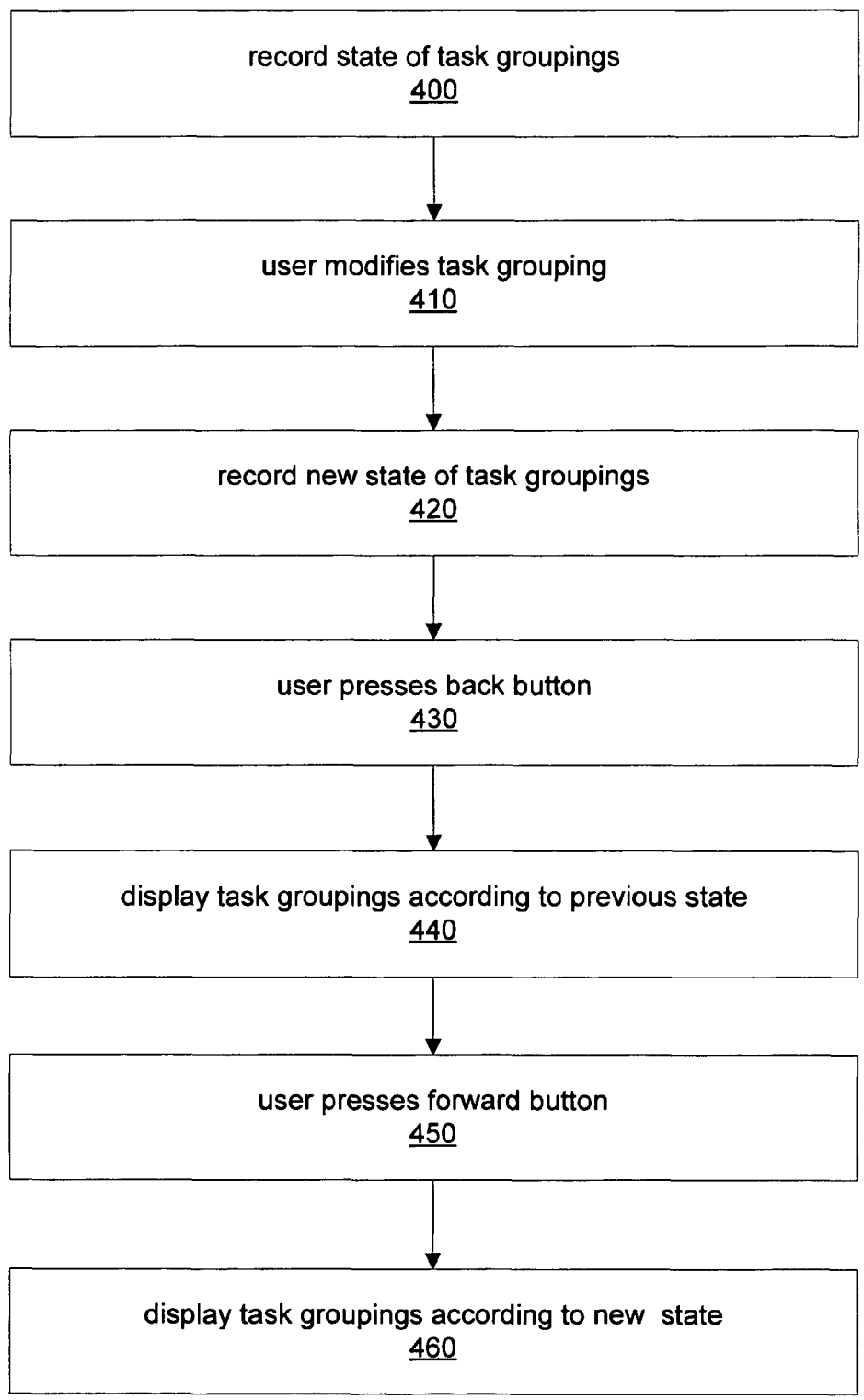
FIG. 4 is a flowchart illustrating one embodiment of a method for recording task grouping state information.

FIG. 4 is a flowchart illustrating one embodiment of a method for recording and browsing the states of a task grouping. As noted above, task grouping mechanism 120 may, in some embodiments, record a history of and/or changes to one or more task groupings and may a allow a user to browse through those recorded states. For instance, task grouping mechanism 120 may in one embodiment record the state of a task grouping, as indicated by block 400. Subsequently, a user may modify something about the task grouping, as indicated by block 410. For example, task grouping mechanism 120 may record changes that a user makes to the layout, arrangement, addition and/or deletion of components in a task grouping, in one embodiment. In another embodiment, task grouping mechanism 120 may record how the user has used one of the components of the task grouping, such as to email a colleague, edit a document, schedule an appointment, etc. In yet another embodiment, task grouping mechanism 120 may record changes made automatically to a task grouping, such as the automatic dynamic rearranging of components based upon a user's context, as will be discussed below. In general, any change to the components of a task group or to data via components of a task group may be included when recording the state of a task grouping, according to various embodiments.

Task grouping mechanism 120 may save the state of task groupings using any suitable mechanism and/or file format. For instance, in one embodiment, task grouping mechanism 120 may utilize a single database structure to store state information, while in another embodiment task grouping mechanism 120 may record a series of individual files, each recording a single state of a task grouping. Alternatively, a structured data description format or data representation language, such as XML, may be used to store and/or record the state of a task grouping. Additionally, task grouping mechanism 120 may also record the currently active task (i.e. the task the user is currently interacting with) as part of a recorded state. Thus, in some embodiments, task grouping mechanism 120 may record a history of which task groupings and which components within each grouping the user access or uses. In response to the user modifying the task grouping or switching to a different task grouping, task grouping mechanism 120 may record a new state of the task groupings, as indicated by block 420. When recording a new state of the task groupings, task grouping mechanism 120 may record the fact that the user switched from one task grouping to another, according to certain embodiments. In one embodiment, task grouping mechanism 120 may record the full configuration of the task groupings with each recorded state. In other embodiments, however, task grouping mechanism may only record a full configuration initially and may record only the changes between two states thereafter.

In response to the user pressing a "back" button, as indicated by block 430, task grouping mechanism 120 may display the task groupings and the components in each grouping according to a previous state, as indicated by block 440. For instance, in one embodiment, pressing the "back" button may change the task groupings one state back in time to the previously recorded state, such as recorded at block 400, described above. When displaying task groupings according to a previous state, task grouping mechanism 120 may be configured to display an indication that a previous state is being displayed. For example, in one embodiment task grouping mechanism 120 may record time stamps with each state and display the date/time with the task grouping when displaying previous states. If the user presses the "back" button multiple times, task grouping mechanism 120 may display the task groupings according to states recorded further back in time. If, however, the user only presses the "back" button once, and then presses the "forward" button, as indicated by block 450, task grouping mechanism 120 may display the task grouping according to the new state as indicated by block 460. Please note that in some embodiments the new state may be the state recorded at block 420, described above.

The ability for a user to browse back through the changes made to, or through, components and task groupings may allow a user to easily recover information that was inadvertently deleted, according to some embodiments. For example, a user may delete a particular piece of data, such as a contact or email message, and may subsequently use a "back" button to temporarily return to a state that included that information, copy the information, return to the current state and save that information via a relevant component. Alternatively, a user may be able to go back and re-add a deleted component to a task grouping from which it was deleted.

Additionally, recorded histories of the states of task groupings may be recorded and browsed within a single task grouping or across task groupings. In other words, in one embodiment task grouping mechanism 120 may store a single history file including the state of all task groupings, while in another embodiment task grouping mechanism 120 may record individual state histories for each task grouping.

Figure 5A:
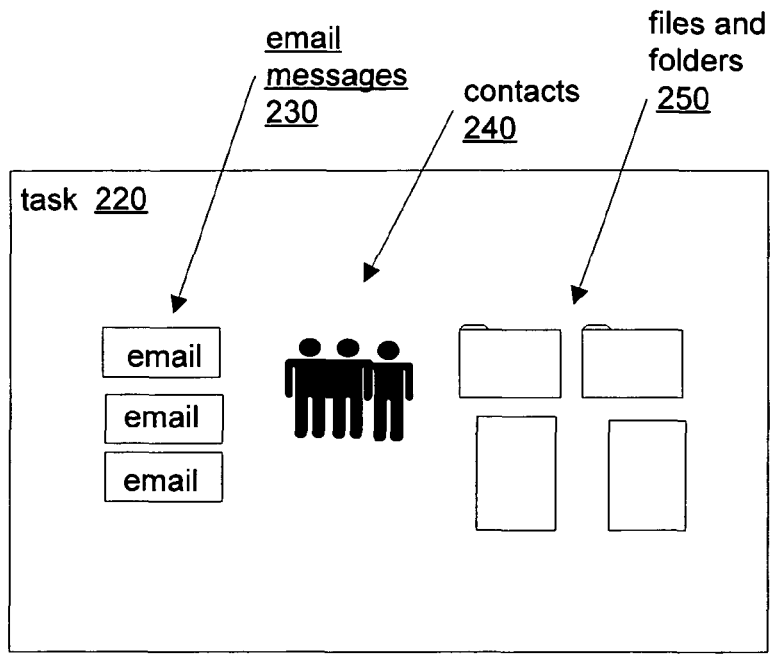
FIGS. 5A and 5B are block diagrams illustrating one embodiment of dynamic rearrangement of application components based upon user context.
Figure 5B:
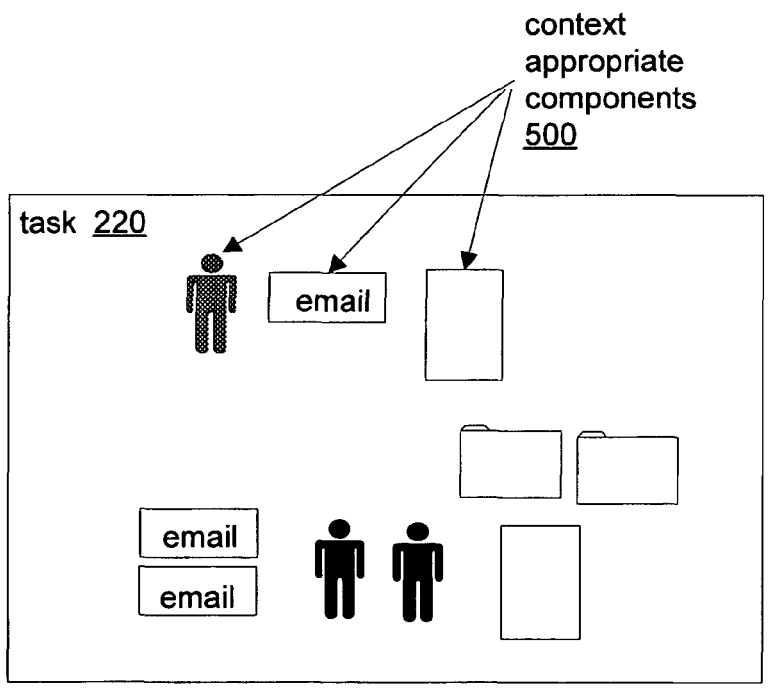

In some embodiments, the spatial or physical arrangement and locations of components in a task grouping may change dynamically based upon various aspects of a user's context. FIGS. 5A and 5B illustrate, according to one embodiment, the dynamic rearranging of components in a task grouping according to the user's context. FIG. 5A illustrates initial or default locations for the various application components in task grouping 220. For instance, a user may have initially arranged email messages 230, contacts 240 and files 250, as illustrated by FIG. 5A, when creating task grouping 220. FIG. 5B illustrates task grouping 220 after three of the components of task 220 have been moved according to a change in the user's context, in one embodiment. For example, task grouping mechanism 120 and/or task grouping 220 may have determined that the user is currently communicating with one of the contacts included in task 220 and therefore may rearrange the components of task 220 so that those components associated with the contact are more visible and/or accessible than the other components in the task grouping. Alternatively, one or more components that are appropriate for the current user context may be highlighted as well as moved to a more visually apparent location within the task grouping. Task grouping mechanism 120 and individual task groupings may dynamically rearrange or may highlight those components more likely to be accessed by a user based upon the user's context. For example, if the user receives an email message from one of the contacts in task grouping 220, those components associated with the person who sent the email message may be displayed more prominently than the other components in the task grouping. Thus, FIG. 5B illustrates components representing the contact itself, an email message (either newly received one or a previously received one) and a document related to the contact. While FIG. 5B illustrates the context appropriate components 500 being displayed above the other components, in other embodiments context appropriate components may be displayed in other manners, such as via highlighting, animation, color, and/or position.

Components of a task grouping may be dynamically rearranged or displayed according to various aspects of the user's context. For instance, the components of a task grouping may be rearranged depending upon such context information as the current files or documents the user is working with, the current contact(s) the user last communicated with, the current day/time, the user's location (such as at home or at the office), according to different embodiments. Additionally, in some embodiments, the components of a task grouping may be rearranged according to a priority relationship among the various components. For instance, those components that have a time constraint may be displayed more prominently that other components. For example, a calendar component with an upcoming appointment may be highlighted or displayed more prominently than other components in the task grouping. Additionally components related or more closely associated with a context appropriate component may also be displayed more prominently. For example, the components associated with an upcoming meeting, such as contact components for the meeting attendees or a document associated with the meeting agenda, may be displayed near the calendar component for the meeting.

Additionally, task groupings that do not utilize a folder border, such as task 260, may also dynamically rearrange context appropriate components within a task grouping. For example, in one embodiment those components more likely to be access by the user based upon the user's context may be placed closer to the main task icon 265 than other components in the task grouping.

Figure 6:
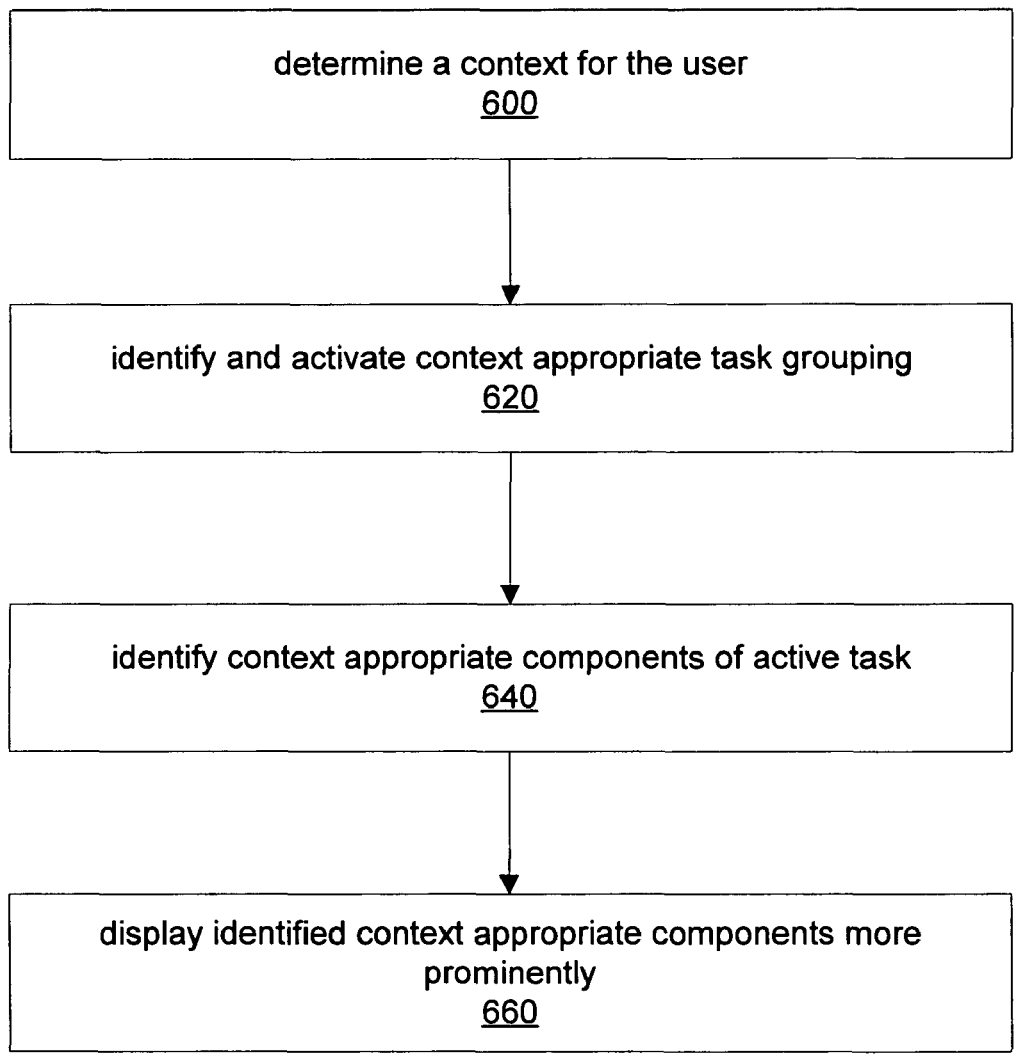
FIG. 6 is a flowchart illustrating one embodiment of a method for dynamic rearrangement of application components based upon user context.

FIG. 6 is a flowchart illustrating one embodiment of a method for dynamically rearranging the components of a task grouping according to user context. As noted above, task grouping mechanism 120 and/or individual task groupings may dynamically rearrange, or otherwise display more prominently, certain components of the task grouping based upon a user context or a change in a user context. Thus, a task grouping may determine a context or a change of context for a current user, as illustrated by block 600. As discussed above, various aspects of a user's context, such as files or documents the user is working with, the contact(s) the user last communicated with, the current day/time, the user's location or login, may be identified/determined and used as a basis for dynamically rearranging the components of a task grouping. After identifying the current user context, task grouping mechanism 120 may identify and activate an appropriate task grouping, as indicated by block 620, according to one embodiment. For example, task grouping mechanism 120 may determine a task or task grouping that the user is more likely to use based upon the current user context. In one embodiment more than one task or task grouping may be identified and activated. In another embodiment, if the user already has a task grouping active, task grouping mechanism 120 may not activate another task grouping.

From among the components included as part of the active task or task grouping, task grouping mechanism 120 may identify one or more context appropriate components, as indicated by block 640. As noted above, those components more likely to be accessed by the user in the current context may be identified as context appropriate components. For example, if the user is currently communicating with a particular person, those components associated with, or related to, that person, such the person's contact information, email messages to/from that person, documents the person has collaborated on, upcoming appointments/meetings with the person, may be identified as context appropriate components. Additionally, other components associated with the context appropriate components may also be identified as context appropriate components. For example, a document included in a recent email message from the person may be identified as a context appropriate component, according to one embodiment.

After identifying the context appropriate components, task grouping mechanism 120 and/or the relevant task grouping may display the identified components more prominently, as indicated by block 660. For instance, the components of the task grouping may be relocated such that the context appropriate components are grouped together in a distinct sub-grouping of components within the larger task grouping, in one embodiment. Alternatively, in another embodiment, color, animation and/or the size of the identified components may be changed in such a way as to highlight the context appropriate components over the other components of the grouping. In some embodiments, the context appropriate components may be moved to locations closer to a main task icon, such as task icon 265. In general however, any suitable method for displaying the context appropriate components more prominently than other components in the same task grouping may be utilized, according to various embodiments.

Those task groupings that are more appropriate for the user's context may also be displayed more prominently than tasks and task groupings that are less context appropriate, according to one embodiment. For example, if task 220 is more appropriate to the user's current context than task 260, task 220 may, as a task grouping, be displayed more prominently than task 260. Additionally, those components within task 220 that are more appropriate to the current context may be displayed more prominently than the other components of task 220. Thus, in some embodiments, the prominence, such as screen location, highlighting, etc, of context appropriate components and entire tasks may be dynamically changed as the user's context changes.

Figure 7:
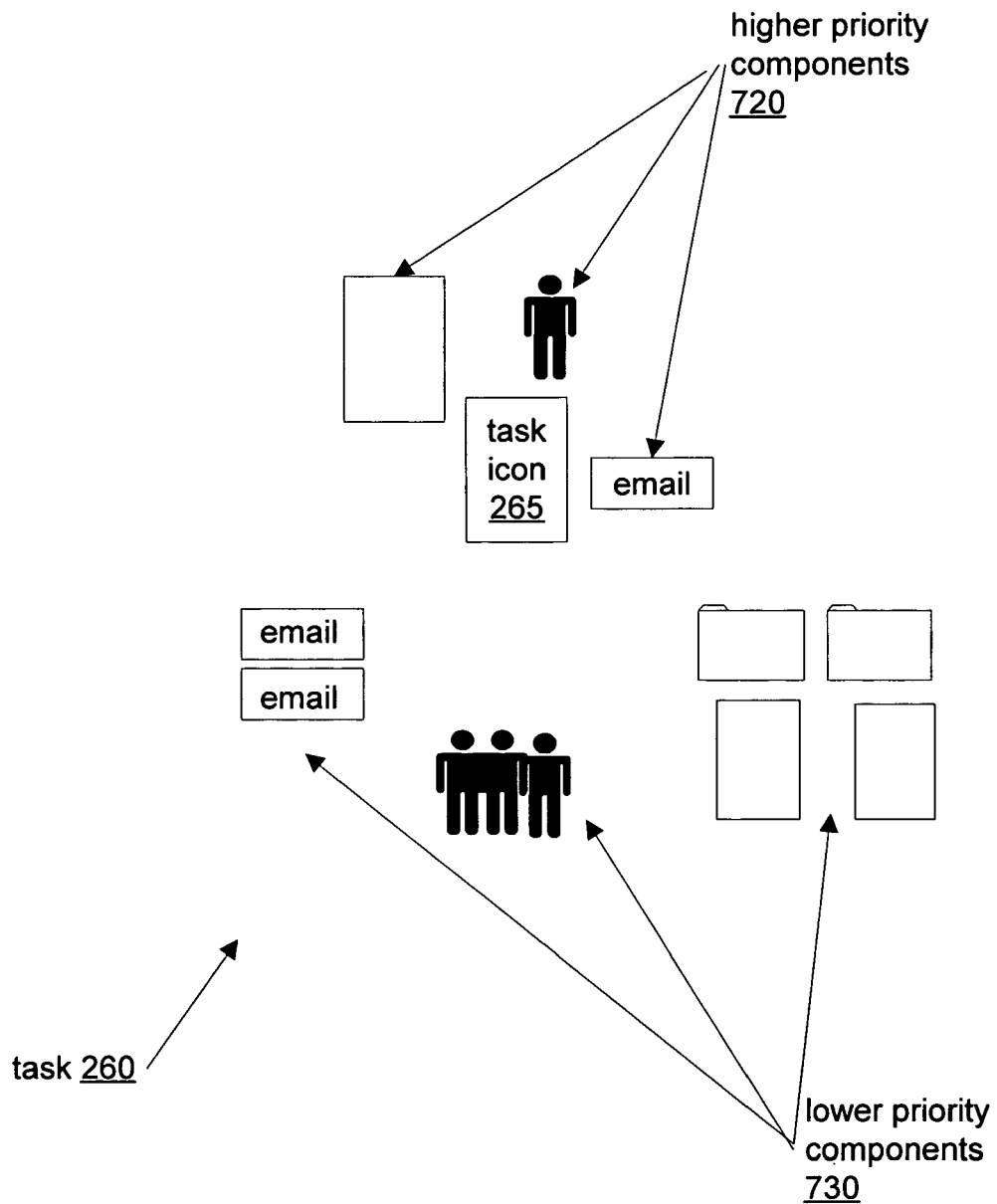
FIG. 7 is a block diagram illustrating dynamic rearrangement of application components within task grouping according to the relative priorities among the components, according to one embodiment.

Additionally, the components in a task grouping may be dynamically rearranged according to a priority relationship among the various components. For example, FIG. 7 is a block diagram illustrating one view of components arranged according to the relative priority of the various components. For instance, the higher priority components 720 of task 260 are displayed in closer proximity to the main task icon 265 than the lower priority components 730. The priority among the various components may either be identified automatically by task 260 (or task grouping mechanism 120) or may be configured manually by a user, according to different embodiments. For example, task 260 may determine that a received email message requesting a reply has not been replied to and may move a component corresponding to that email message closer to task icon 265 to reflect the email message's higher priority. Similarly, task 260 may determine that a particular person has unsuccessfully attempted to contact the local user, such as via instant messaging, and in response may move a component corresponding to the person closer to task icon 265. Please note that any of the methods and manners described above to more prominently display a context appropriate component may also be used to display a higher priority component. Thus, highlighting, color, animation, size, and/or location, among other things, may be used, both singly and in combination, to more prominently display higher priority components. While the priority of a task component may, in some instances and embodiments, correspond to the context appropriateness of the component, in other embodiments, the priority of a component may be unrelated to the user's context. For example, an un-replied to email may have a high priority regardless of whether the email message is appropriate to user's current context.

In some embodiments, different displaying schemes may be utilized, either separately or in combination, to display both the context appropriateness and the priority of an individual component of a task grouping. For example, color or other highlighting may be used to indicate a component's context appropriateness while location, such as proximity to a main task icon, may be used to indicate the relative priority of the component. In general, the dynamic rearranging and displaying of components according to both their individual context appropriateness and priority may be configured by the user, according to various embodiments.

Additionally, in some embodiments, task grouping mechanism 120 may be configured to use a three dimensional display and may utilized the apparent depth of an object in the 3-D view to indicate the relative priority, or context appropriateness, of components in a task grouping. Thus, in one embodiment, those components in a task grouping with higher priority may be displayed to appear closer to the front to the 3-D view, and consequently both closer to the user and bigger than other components in the same task-grouping. Similarly, those tasks or task components that are more appropriate or important according to the user's current context may be moved "closer" and other tasks or components may be moved "farther away" within the 3-D view.

Figure 8:
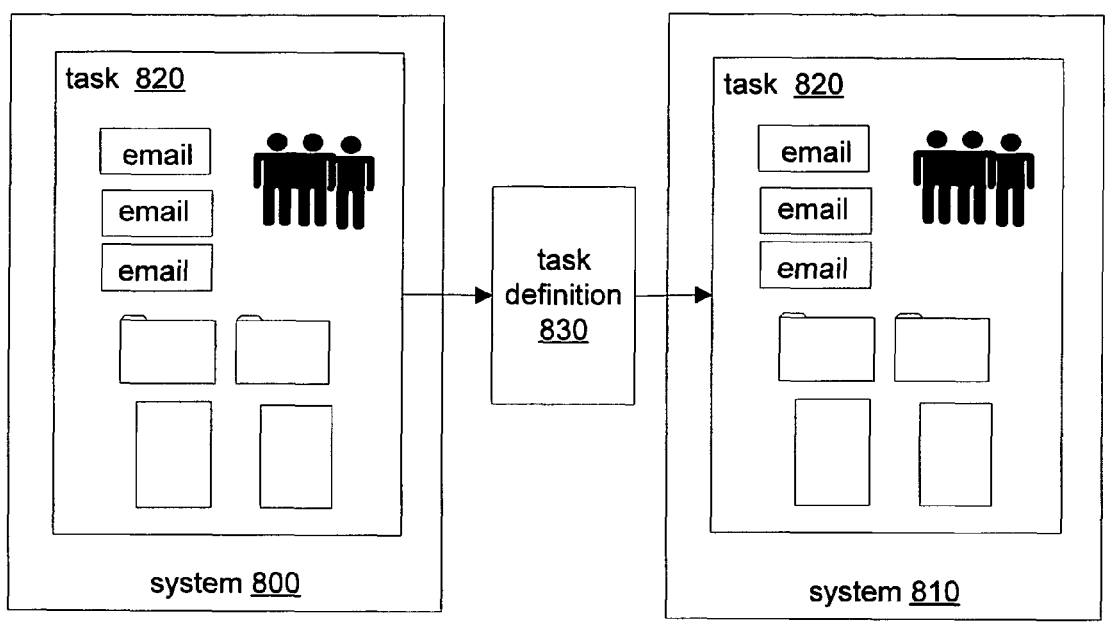
FIG. 8 is a block diagram illustrating the sharing of task groupings between systems, according to one embodiment.

FIG. 8 is a block diagram illustrating the sharing of task groupings between systems, according to one embodiment. Since multiple people frequently work together on a single task or project, task groupings may be shared among different users on different computer systems. For example, a person on system 800 may have created task 820 including various application components and may desire to share task grouping 820 with a colleague that is using system 810. According to one embodiment, a task definition 830 recording and specifying the structure of task grouping 820 may be created from task 820 and may be transferred to system 810. Once a task definition 830 has been transferred to system 810, another copy of task grouping 820 may be created on system 810 according to task definition 830.

In one embodiment, task definition 830 may be implemented using a markup language, such as XML. In other embodiments, however, other file formats, either existing or custom, may be used to record and specify a task definition. Additionally, any suitable method for communicating or transferring task definition 830 between system 800 and system 810 may be utilized, according to various embodiments. For example, in one embodiment task definition 830 may be sent as an email attachment. In another embodiment, task definition 830 may be saved to a shared storage device, such as to a network server, from which system 810 may access it. In yet another embodiment, a peer-to-peer communication mechanism may used to transfer task definition 830 from one system to another. In general, any suitable communications mechanism may be used to transfer task definitions between systems.

In one embodiment, system 800 and system 810 be represent two different types of systems running two different types of task grouping mechanisms. For example, system 800 may be a Linux-based system, while system 810 may be Macintosh, MS windows or Sun OS based. Since task definitions may, in some embodiments, be stored as text files (such as with XML) they may be utilized to communicate task definitions between different types of systems.

In one embodiment, task grouping mechanism 120 may be configured to automatically save task definitions for every task grouping and save the definitions to a shared, central location for access by other systems. In other embodiments, however, no task definitions may be automatically created, but the user may be able to manually specify one or more task groupings for which task definitions should be created.

Figure 9:
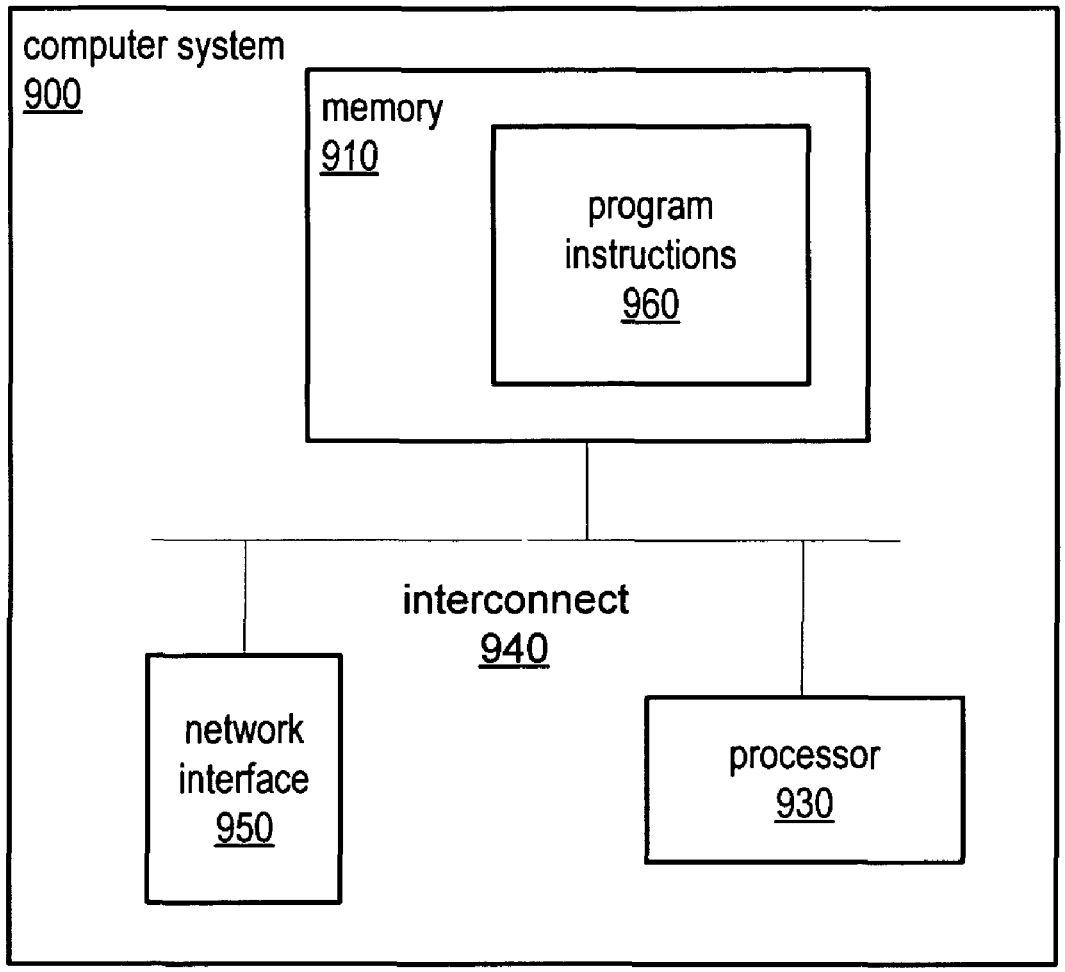
FIG. 9 is a block diagram illustrating an exemplary computer system capable of implementing application boundary decomposition and dynamic grouping of application components, according to one embodiment.

FIG. 9 illustrates a computing system capable of implementing application boundary decomposition and application component regrouping, as described herein and according to various embodiments. Computer system 900 and/or systems 100, 700 or 710, described above, may be any of various types of devices, including, but not limited to, a personal computer system, desktop computer, laptop or notebook computer, mainframe computer system, handheld computer, workstation, network computer, a consumer device, application server, storage device, or in general any type of computing device.

Computer system 900 may include at least one processor 930. Processor 930 may couple across interconnect 940 to memory 910. Memory 910 is representative of various types of possible memory media, also referred to as "computer accessible media." Hard disk storage, floppy disk storage, removable disk storage, flash memory and random access memory (RAM) are examples of memory media. The terms "memory" and "memory medium" may include an installation medium, e.g., a CD-ROM or floppy disk, a computer system memory such as DRAM, SRAM, EDO RAM, SDRAM, DDR SDRAM, Rambus RAM, etc., or a non-volatile memory such as a magnetic media, e.g., a hard drive or optical storage. The memory medium may include other types of memory as well, or combinations thereof.

In some embodiments, memory 910 may include program instructions configured to implement application boundary decomposition and application component regrouping as described herein. In certain embodiments memory 910 may include program instructions configured to implement an task grouping mechanism, such as task grouping mechanism 120. In such embodiments, task grouping mechanism 120 may include program instructions configured to implement application boundary decomposition and application component regrouping as described herein. An task grouping mechanism may be implemented in any of various programming languages or methods. For example, in one embodiment, task grouping mechanism 120 may be JAVA based, while in another embodiments, task grouping mechanism 120 may be written using the C or C++ programming languages.

Although the embodiments above have been described in detail, numerous variations and modifications will become apparent once the above disclosure is fully appreciated. It is intended that the following claims be interpreted to embrace all such variations and modifications.

What is claimed is:

1. A system, comprising:
a processor, and
a memory, wherein the memory comprises program instructions executable by the processor to implement:
  a plurality of independent application components, wherein each of the plurality of application components is an independent portion of a respective software application and executes a service or user interface of the respective software application, and wherein at least one of the plurality of application components is an independent portion that is less than an entire respective software application; and
  a task grouping mechanism configured to provide a task grouping user interface comprising a plurality of application component representations, wherein each application component representation corresponds to one or more of the application components, and wherein at least two of the plurality of application component representations correspond to application components that are independent portions of different software applications;
  wherein the task grouping user interface is configured to allow user selection of a plurality of the application component representations;
  wherein the task grouping mechanism is further configured to include in the plurality of application component representations one or more application component representations dependent on a user's current context, wherein the user's current context comprises current activities of the user; and in response to said user selection, the task grouping mechanism is further configured to associate, as a single task group of application components used to complete a task, application components corresponding to the selected application component representations, wherein the single task group of associated application components comprises at least two associated application components that are independent portions of different software applications, and wherein the single task group of associated application components is configured to be user manipulated to act as a single unit to complete the task.

2. The system of claim 1, wherein one or more of the plurality of application component representations correspond to a respective one or more executing instances of the application components, wherein in response to a user selecting a representation corresponding to one of the executing instances of the application component, the task grouping mechanism is further configured to associate the executing application component corresponding to the selected representation with the single task group.

3. The system of claim 1, wherein the program instructions are further executable to store information defining the single task group, wherein the information specifies the associated application components.

4. The system of claim 3, wherein the stored information comprises a structured data description format.

5. The system of claim 4, wherein the structured data description format comprises XML.

6. The system of claim 3, wherein the program instructions are further executable to send the stored information to another system, wherein the stored information is configured for use on the another system for generating a version of the task grouping.

7. The system of claim 1, wherein the program instructions are further executable to store information specifying a current state of the single task group.

8. The system of claim 7, wherein the program instructions are further executable to store the information specifying the current state of the single task group to a shared storage device via a network, wherein the stored information is configured to be accessed by other computer systems via the network.

9. The system of claim 7, wherein the program instructions are further executable to access the stored information specifying the current state of the single task group to return the single task group to the current state.

10. The system of claim 1, wherein in response to received user input indicating selection of another of the plurality of application component representations, the task grouping mechanism is further configured to include in the single task group one or more other application components corresponding to the selected another application component representation.

11. The system of claim 10, wherein the task grouping mechanism is further configured to store information indicating the inclusion of the one or more other application components in the single task group.

12. The system of claim 11, wherein the task grouping mechanism is further configured to display one or more user interface elements indicating user initiated changes to the single task group, wherein the displayed one or more user interface elements include information indicating the inclusion of the one or more other application components in the single task group.

13. The system of claim 10, wherein the task grouping mechanism is further configured to restore the single task group to a state of the single task group existing prior to the inclusion of the one or more other application components in the single task group.

14. The system of claim 1, wherein the task grouping mechanism is further configured to spatially arrange the one or more associated application components of the single task group according to a priority relationship among the one or more associated application components.

15. The system of claim 1, wherein the task grouping mechanism is further configured to move one or more of the associated application components of the single task group to maintain a spatial arrangement of one or more user interface elements of the single task group in relation to one of the associated application components moved by a user.

16. The system of claim 1, wherein the task grouping mechanism is further configured to display a user interface component representing the single task group as an icon in a menu bar of an operating system executing on the system.

17. The system of claim 1, wherein the task grouping mechanism is part of an operating system executing on the system.

18. The system of claim 1, wherein the task grouping mechanism is configured to access services and software libraries of an operating system executing on the system.

19. A method, comprising:
providing a task grouping user interface mechanism comprising representations of a plurality of application components, wherein each representation corresponds to one or more of the application components, wherein one or more of the representations is dependent on a user's current context, wherein the user's current context comprises current activities of the user, wherein each of the plurality of application components is an independent portion of a respective software application and executes a service or user interface of the respective software application, wherein at least one of the plurality of application components is an independent portion that is less than an entire respective software application, and wherein at least two of the representations correspond to application components that are independent portions of different software applications;

receiving user input selecting a plurality of the application component representations; and in response to said user input, associating, as a single group of application components used to complete a task, application components corresponding to the selected application component representations, wherein the single task group of associated application components comprises at least two associated application components that are independent portions of different software applications, and wherein the single task group of associated application components is configured to be manipulated to act as a single unit to complete the task.

20. A non-transitory computer accessible medium, comprising program instructions executable to implement:
providing a task grouping user interface mechanism comprising representations of a plurality of application components, wherein each representation corresponds to one or more of the application components, wherein one or more of the representations is dependent on a user's current context, wherein the user's current context comprises current activities of the user, wherein each of the plurality of application components is an independent portion of a respective software application and executes a service or user interface of the respective software application, wherein at least one of the plurality of application components is an independent portion that is less than an entire respective software application, and wherein at least two of the representations correspond to application components that are independent portions of different software applications;

receiving user input selecting a plurality of the application component representations; and in response to said user input, associating, as a single task group of application components used to complete a task, application components corresponding to the selected application component representations, wherein the single task group of associated application components comprises at least two associated application components that are independent portions of different software applications, and wherein the single task group of associated application components is configured to be manipulated to act as a single unit to complete the task.

* * * * *